United States Patent
Richard de Latour (10) Patent No.: US 8,144,752 B2
(45) Date of Patent: Mar. 27, 2012

(54) METHOD AND DEVICE FOR RECEIVING A BOC MODULATION RADIO-NAVIGATION SIGNAL

(75) Inventor: Antoine Richard de Latour, Toulouse (FR)

(73) Assignee: Centre National d'Etudes Spatiales, Paris (FR)

( * ) Notice: Subject to any disclaimer, the term of this patent is extended or adjusted under 35 U.S.C. 154(b) by 498 days.

(21) Appl. No.: 12/521,250

(22) PCT Filed: Dec. 12, 2007

(86) PCT No.: PCT/FR2007/002051
§ 371 (c)(1), (2), (4) Date: Jun. 25, 2009

(87) PCT Pub. No.: WO2008/090276
PCT Pub. Date: Jul. 31, 2008

(65) Prior Publication Data
US 2010/0027593 A1 Feb. 4, 2010

(30) Foreign Application Priority Data
Dec. 28, 2006 (FR) ...................... 06 11486

(51) Int. Cl.
*H04B 1/00* (2006.01)
(52) U.S. Cl. ........ 375/150; 375/142; 375/343; 370/320; 370/441; 370/479
(58) Field of Classification Search .................. 375/140, 375/141, 142, 147, 150, 261, 340, 343, 326, 375/344, 367; 370/320, 335, 441, 479, 515
See application file for complete search history.

(56) References Cited

U.S. PATENT DOCUMENTS

| | | | | |
|---|---|---|---|---|
| 7,555,033 | B2 * | 6/2009 | Lillo et al. | ..................... 375/150 |
| 7,860,145 | B2 * | 12/2010 | Knight et al. | .................. 375/130 |
| 2003/0231580 | A1 | 12/2003 | Martin et al. | |
| 2005/0281325 | A1 | 12/2005 | Lillo et al. | |
| 2006/0097915 | A1 | 5/2006 | Martin et al. | |
| 2006/0128343 | A1 | 6/2006 | Leblond et al. | |

FOREIGN PATENT DOCUMENTS

| | | |
|---|---|---|
| EP | 1 315 308 | 5/2003 |
| FR | 2 848 743 | 6/2004 |
| FR | 2 853 967 | 10/2004 |

OTHER PUBLICATIONS

International Search Report dated Jul. 25, 2008, from corresponding PCT application.

* cited by examiner

*Primary Examiner* — Dac Ha
(74) *Attorney, Agent, or Firm* — Young & Thompson

(57) ABSTRACT

Disclosed is a receiver and a method for receiving a radio-electric navigation signal modulated by a carrier at a frequency $f_p$, a sub-carrier at a frequency $f_{sp}$ and a pseudo-random code at a frequency $f_c$, in which the radio-electric signal is converted into a two-way base band I, Q, characterized in that K modified pseudo-random codes, where $K=\alpha \cdot f_{sp}/f_c$, a being a predetermined integer, are generated locally by a modified code generator, each modified code having, during a time duration $T_k$ where $T_k=1/\alpha \cdot f_{sp}$, the shape of the pseudo-random code without the sub-carrier, and being offset in time by a duration $T_k$ of the preceding modified pseudo-random code; in both ways, the signal is multiplied by the K modified codes and is phase- and quadrature-correlated by two phase and quadrature sub-carriers generated locally.

20 Claims, 5 Drawing Sheets

METHOD AND DEVICE FOR RECEIVING A BOC MODULATION RADIO-NAVIGATION SIGNAL

The invention relates to a process and to a device for receiving modulated radio-navigation signals emitted by satellites of a navigation system which are intended to enable an autonomous determination of the position of the receiving device in a reference frame peculiar to this system.

The principal radio-navigation systems currently available are the American system, GPS (Global Positioning System), the Russian system, GLONASS (Global Orbitography Navigation Satellite System), and the new European system GALILEO constituted by thirty satellites in medium orbit.

The positioning of a receiving terminal—called the 'receiver' throughout the text—in such a system is based on the knowledge of the distances, so-called pseudo-distances, between this receiver and several satellites of this system (at least three for a positioning in three dimensions, in practice four, in order to remove the uncertainty in respect of the clock-shift between the system and the receiver). Each pseudo-distance is derived from the position of the satellite and from the measurement of the propagation-time of a signal between the satellite, equipped with its own clock, and the receiver.

For each system, the positions of the satellites are determined on the basis of a network of ground stations which is independent of the receivers. These positions are transmitted to the receivers by the satellites themselves. Consequently, each receiver is able to evaluate the delay of such received signals in relation to the clocks of the satellites, which are all synchronous. Each receiver can accordingly deduce the corresponding pseudo-distances from the measurement of these delays and from the knowledge of the positions of the satellites. The precision of the positioning is therefore directly linked to the precision of the measurement of these delays.

Typically, these signals are constructed by the modulation of binary data at a low regular rate that correspond to information necessary to the receiver for the calculation of the position (identification of the satellite, temporal reference, ionospheric correction, almanacs or astronomical tables, etc.) by pseudo-random binary sequences clocked at high frequency $f_c$. These signals are then transposed into the range of frequency of emission by modulation with an emission carrier of frequency $f_p$.

In this way, the receiver is able to extract the data contained in the received signal by a first demodulation with the aid of a locally generated carrier for the purposes of transposing the signal to the baseband and a second demodulation with the aid of locally generated pseudo-random sequences. The measurement of the delay is derived from the measurement of the delay of the pseudo-random sequences and from the measurement of the delay of the carrier.

Furthermore, for the purposes of enabling, in particular, the cohabitation of the GPS and GALILEO systems within the known frequency band under the name of band E2-L1-E1 [1559 MHz to 1591 MHz], where the only bands available for the GALILEO system consist of two bands of 4 MHz arranged on either side of band L1 already occupied by the GPS system, it has been necessary to define a particular modulation, called BOC (Binary Offset Carrier), which has the distinctive feature of exhibiting a spectrum composed of at least two principal lobes which are offset symmetrically in relation to the central frequency of band L1 (1575.42 MHz).

On the other hand, the new military signal of the GPS system known under the name of code M (or M-code) uses BOC modulations for frequency bands L1 [1563 MHz to 1587 MHz] and L2 [1215 MHz to 1237 MHz].

The GALILEO system also provides the transmission of BOC-modulated signals in the E6 frequency band [1260 MHz to 1300 MHz].

The construction of such BOC signals uses, in addition to the pseudo-random binary sequences previously described, a square subcarrier of frequency $f_{sp}$. A BOC signal is typically written as BOC(m,n), where m and n define, respectively, the whole-number ratio of the frequency $f_{sp}$ of the subcarrier of this BOC signal to the frequency of the pseudo-random binary sequence of a GPS signal emitted on band L1, this frequency amounting to 1023 MHz, and the whole-number ratio of the frequency $f_c$ of the pseudo-random binary sequence of this BOC signal to this frequency of the pseudo-random binary sequence of a GPS signal emitted on band L1, amounting to 1023 MHz. These parameters make it possible, in particular, to compare a BOC signal to a GPS signal emitted on band L1. Moreover, since the central frequency of a BOC signal is the central frequency of band L1, it is easy to realise GPS and GALILEO dual-mode receivers.

Various processes and devices exist for receiving such BOC signals. Typically, a receiver of a BOC signal comprises a first module—called the radio-frequency module throughout the following—which is suitable to enable the digitisation of the analogue signal received, and a second module—called the digital module throughout the following—which is suitable to demodulate the digitised signal with a view to extracting therefrom the information transmitted by the satellite and the evaluation of the various delays.

FR 2 848 743 describes, for example, a process for processing a BOC signal, comprising a first step of processing the analogue signal, consisting in carrying out a frequency translation of the two main lobes of the signal towards one another by the multiplication of the input signal by an analogue signal of the type cos(ω·t) with a view to enabling a digitisation of the signal by a sampling that does not consume much energy, and a second processing step consisting in demodulating the signal digitised in this way by correlations of the signal with a carrier, a subcarrier and locally generated codes.

This general technique of demodulation of a BOC signal exhibits the drawback of having recourse to numerous integrations, entailing the consumption of a large amount of energy. Consequently, a receiver implementing such a process has to be regularly resupplied with energy, thus limiting its autonomy.

FR 2 853 967 describes a process of acquisition of a radio-navigation signal of BOC type, this acquisition being carried out by a receiver comprising a channel for carrier correlation in phase and in quadrature between the received signal and two locally generated carriers in phase and in quadrature, a channel for subcarrier correlation in phase and in quadrature between the output signals of the channel for carrier correlation, and two locally generated subcarriers and a channel for correlation of locally generated code.

The drawback of such a processing always lies in the excessive consumption of energy which is necessary in order to ensure the demodulation of the signal. In particular, in tracking phase the correlation channels require eight integrators. An integration is an operation necessitating a lot of energy resources.

The invention aims to propose a process and a device for receiving a radio-navigation signal of BOC type that consume few calculating resources and energy resources.

The invention aims, in particular, to propose a process and a device for receiving a BOC signal, wherein the demodulation of the signal consumes less energy than the demodulation of the signal of the processes and devices of the prior art.

The invention also aims to propose a process and a device for receiving a BOC signal, wherein the demodulation of the signal is rapid.

The invention also aims to propose a process for receiving a BOC signal that can equally enable the acquisition and the tracking of the signal.

The invention also aims to propose a process for receiving a BOC signal that can enable the demodulation of a signal with a weak or elevated subcarrier.

The invention also aims to propose a process and a device for receiving a BOC signal comprising two distinct subcarriers.

In order to do this, the invention relates to a process for receiving a radioelectric composite navigation signal comprising at least one signal, known as the BOC signal, modulated by a carrier of frequency $f_p$, a subcarrier of frequency $f_{sp}$ and a pseudo-random code of frequency $f_c$, in which:
- the radioelectric signal is transposed to an intermediate frequency and digitised,
- the digitised signal is correlated in phase and in quadrature with two local carriers in phase and in quadrature generated by a local carrier oscillator digitally controlled so as to provide a baseband signal comprising a channel, called channel I, and a channel, called channel Q, in quadrature in relation to channel I, characterised in that:
- successive pseudo-random codes, known as modified codes, K in number, where $K=\alpha \cdot f_{sp}/f_c$, α being a predetermined integer, are generated locally by a digital generator of modified codes, each modified code exhibiting over a time-span $T_k$, where $T_k=1/\alpha \cdot f_{sp}$, the form of the pseudo-random code without subcarrier, two successive modified codes being temporally offset by a duration $T_k$,
- on each channel the baseband signal is multiplied by the K modified pseudo-random codes,
- on each channel the K resulting signals are integrated over a predetermined period of time,
- on each channel the K results of integrations are temporally interlaced,
- on each channel the signal thus generated is correlated in phase and in quadrature by two locally generated subcarriers in phase and in quadrature,
- on each channel the output signal of the subcarrier-correlation channel is integrated over a predetermined period of time.

A process according to the invention replaces the processing currently used by the majority of the receivers of BOC-modulated radio-navigation signals, including, for each of the channels I and Q, a step of correlation of the received signal by locally generated pseudo-random codes with their subcarrier in phase and in quadrature, by a step of generation of modified codes enabling a step of correlation of the signal received by the modified codes prior to a step of correlation of the resulting signals by two locally generated subcarriers in phase and in quadrature.

Such a process makes it possible to reduce the number of integrations required in order to ensure the demodulation of the received BOC signal. In particular, the generation of K modified codes, where $K=\alpha \cdot f_{sp}/f_c$, α being a predetermined integer, makes it possible to reduce the demodulation of a BOC signal comprising a carrier, a subcarrier and pseudo-random codes to the demodulation of a signal comprising a carrier and a subcarrier. In other words, the step of demodulation of the code of the prior art is replaced by a step of generation of modified codes which is coupled to a step of demodulation of the subcarrier. The step of correlation in respect of the code of the prior art is thus eliminated, which reduces the number of integrations necessary for the demodulation of a BOC signal.

A process according to the invention therefore consumes less in terms of energy resources than the processes of the prior art.

Each modified code exhibits over a time-span $T_k$, where $T_k=1/\alpha \cdot f_{sp}$, the form of the code without subcarrier and is temporally offset from the following modified code by a duration $T_k$. This means that the sum of the K modified codes thus generated represents the code without subcarrier over a time-span of duration $1/f_c$.

According to one embodiment of the invention, the correlation of the baseband signal by these K modified codes and the integration of the resulting signals over a predetermined period can be carried out by the generation of a first modified code multiplied by the baseband signal and transmitted to a first integration block. The first modified code is then transmitted to a flip-flop of duration $T_k$, in order to effect a temporal offset of duration $T_k$ of this code so as to generate the second modified code. This second modified code is multiplied by the baseband signal and transmitted to a second integration block. The operation may be repeated up until the generation of the last modified code and the integration of the last resulting signal.

According to an embodiment variant, the modified-code generator can be replaced by a pseudo-random-code generator associated with a module that is suitable to effect a sequential link with K integration blocks.

A process according to the invention enables the reception of a radio-navigation signal by ensuring the digitisation of the signal and the demodulation of the digitised signal.

Typically, the reception of a radio-navigation signal comprises a first processing, called signal-acquisition processing, and a second processing, called signal-tracking processing.

Advantageously and according to the invention, a process according to the invention comprises steps in which,
- an estimate of energy is calculated on the basis of the channel output signals,
- an estimate of the phase of the carrier is calculated on the basis of said channel output signals, integrated.

These two steps make it possible to estimate the delay of the pseudo-random code based on an estimation of energy and the correction to the phase of the carrier in the course of the signal-acquisition processing.

Once the estimation of the delay of the code and the estimation of the phase of the subcarrier have been realised, a process according to the invention is suitable to ensure the signal-tracking processing.

Advantageously and according to the invention, in the tracking phase
- an estimate of the phase of the carrier is calculated on the basis of the channel output signals,
- an estimate of the phase of the subcarrier is calculated on the basis of the channel output signals,
- a correction of the phase of the carrier and of the delay of the code are carried out if said estimated energy diminishes in the course of time,
- a demodulation of the navigation data transmitted by the BOC signal is carried out.

A process according to the invention enables the acquisition of the signal and the tracking of the signal. These two processing operations are carried out by minimising the recourse to energy resources, by limiting the number of integrations necessary for the demodulation of the signal.

The estimation of the energy of the signal can be carried out by all the known means.

Nevertheless, advantageously and according to the invention, the estimation of energy is carried out by a quadratic sum of each of the channel output signals.

The estimation of the phase of the subcarrier can be carried out by any known means.

Nevertheless, advantageously and according to the invention, the estimation of the phase of the subcarrier is carried out by an estimator of the arctangent type.

A process according to the invention includes a step of generation of K modified pseudo-random codes, where $K=\alpha \cdot f_{sp}/f_c$. K expresses the partitioning carried out by the subcarrier over a fragment of pseudo-random code. Consequently, the value of the integer $\alpha$ depends on the shape of the subcarrier, in particular the sign of the subcarrier. A process according to the invention enables the processing of any BOC signal, whatever the partitioning carried out by the subcarrier over a fragment of pseudo-random code.

In general, the subcarrier of a BOC-modulated signal exhibits two levels. The value of the integer $\alpha$ is dependent on number of levels of the subcarrier. In the given case, for a subcarrier with two levels the value of the integer $\alpha$ must be multiple of 4.

Consequently, advantageously and according to the invention, the value of the integer $\alpha$ is fixed at 4.

Nevertheless, for a subcarrier exhibiting a greater number of levels the value of the integer $\alpha$ is fixed at a multiple value of this number of levels of this subcarrier.

A process according to the invention enables the reception of a BOC signal with one channel and the reception of a BOC signal with two channels, in particular a pilot channel and a data channel. In order to do this, a process according to the invention includes a step of generation of modified pseudo-random codes for the pilot channel, and a step of generation of modified pseudo-random codes for the data channel. All the other steps are on each channel, pilot channel and data channel, similar to those mentioned previously.

The invention extends to a receiver of a composite radio-navigation signal comprising at least one signal modulated by a carrier, a square subcarrier, and a pseudo-random code.

In order to do this, the invention also relates to a receiver of a radioelectric composite navigation signal comprising at least one signal, called the BOC signal, modulated by a carrier of frequency $f_p$, a subcarrier of frequency $f_{sp}$ and a pseudo-random code of frequency $f_c$, comprising:
- a circuit for correlation of residual carrier in phase and in quadrature between said BOC signal and two local carriers in phase and in quadrature generated by a local carrier oscillator, so as to provide a baseband signal comprising a channel, called channel I, and a channel, called channel Q, in quadrature in relation to said channel I, characterised in that it comprises:
- a digital generator of K pseudo-random codes, called modified codes, where $K=\alpha \cdot f_{sp}/f_c$, $\alpha$ being a predetermined integer, each modified code exhibiting over a time-span $T_k$, where $T_k=1/\alpha \cdot f_{sp}$, the form of the pseudo-random code without subcarrier, and being temporally offset by a duration $T_k$ from the preceding modified pseudo-random code,
- a circuit for correlation in phase and in quadrature between the baseband signal and the K modified pseudo-random codes,
- a circuit for correlation in phase and in quadrature between the resulting signals and two locally generated subcarriers in phase and in quadrature.

Advantageously, a receiver according to the invention comprises a carrier-phase estimator, a subcarrier-phase estimator and an energy estimator.

Advantageously, a receiver according to the invention comprises a subcarrier-phase estimator of the arctangent type.

A process according to the invention is advantageously implemented in and by a receiver according to the invention.

The invention relates, in addition, to a process for receiving a radio-navigation signal and to a receiver of a radio-navigation signal, characterised in combination by all or some of the characteristics mentioned above or below.

Other characteristics, objectives and advantages of the invention will become apparent from the following description, which presents, by way of non-limiting example, an embodiment of the invention with reference to the appended drawings; in these drawings.

Figure 1:
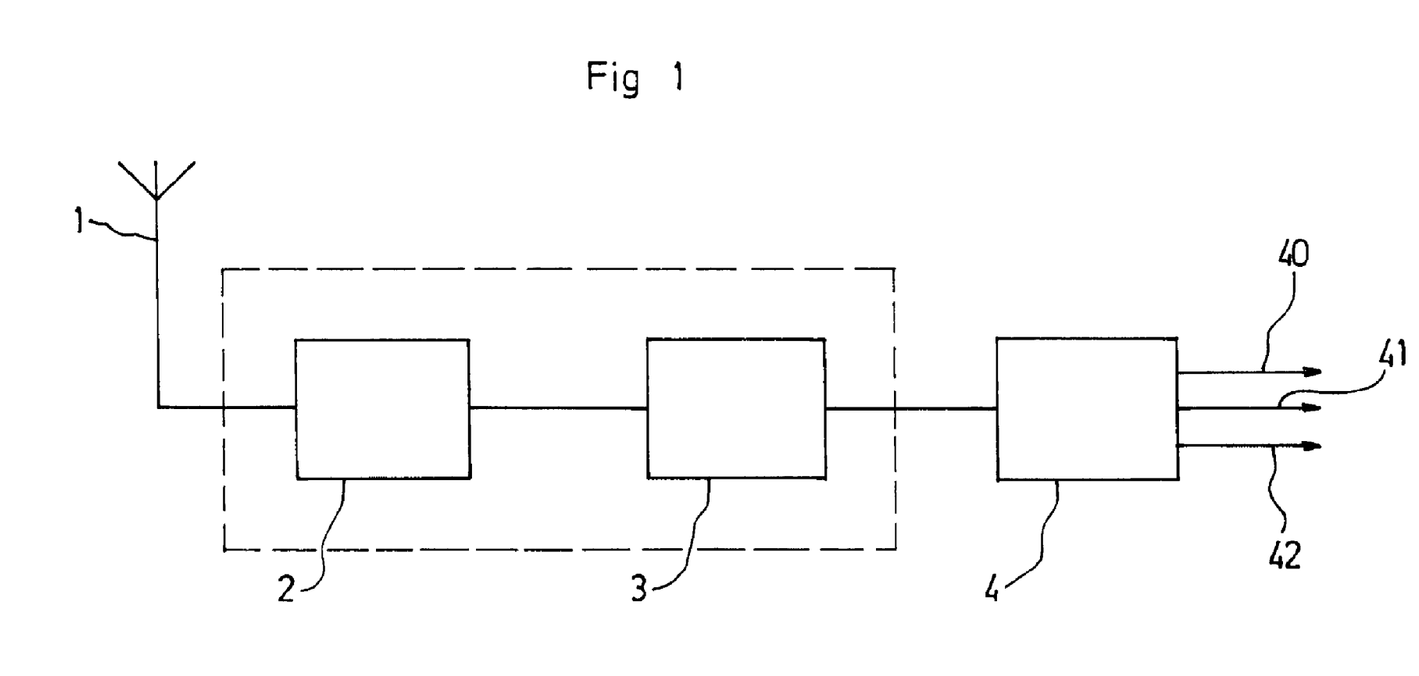
FIG. 1 is a schematic view of a receiver of a radio-navigation signal according to the invention.

The receiver shown in FIG. 1 comprises an antenna 1 which is suitable to receive a radioelectric signal from a satellite, a radio-frequency module 2 which is suitable to edit the received radioelectric signal for processing thereof by a digital module 4. The radio-frequency module 2 performs known functions of amplification, of filtering and of spectral translation of the received signal. The radio-frequency module 2 is associated with a digitisation module 3 which is suitable to sample the signal at the output of the radio-frequency module 2. This digitised signal is projected onto channels in phase and in quadrature of a digital module 4. The digital module 4 performs functions of unspreading of the signal and of the data. This module 4 can also carry out operations of bringing the lobes closer together for the signals with elevated subcarrier. The digital module 4 makes it possible to provide to at least three outputs 40, 41, 42, respectively, the data transmitted by the received signal, an estimation of the phase of the carrier and an estimation of the delay.

The digital module 4 realises the unspreading of the data signal by correlation of the input signal with locally generated reference signals. This operation necessitates the temporal alignment of the locally generated reference signal and the estimation of the carrier-phase/local-reference error.

A signal modulated in accordance with a BOC modulation includes a carrier of frequency $f_p$, a subcarrier of frequency $f_{sp}$ and a pseudo-random code of frequency $f_c$.

Figure 2A:
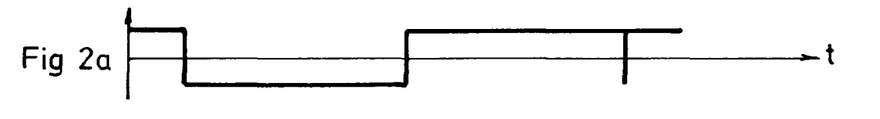
FIG. 2 is a schematic view of the modulation signals of a BOC signal, of a resulting BOC signal, and of modified pseudo-random codes generated in accordance with the invention.
Figure 2B:
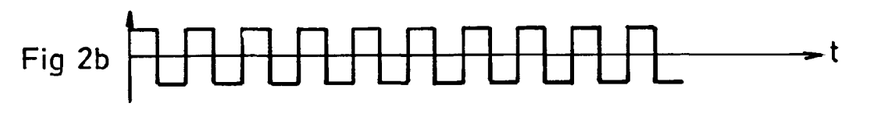
Figure 2C:
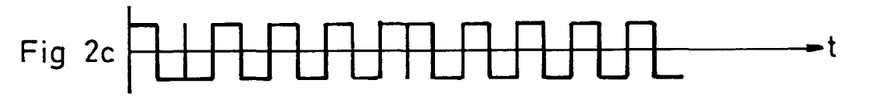
Figure 2D:
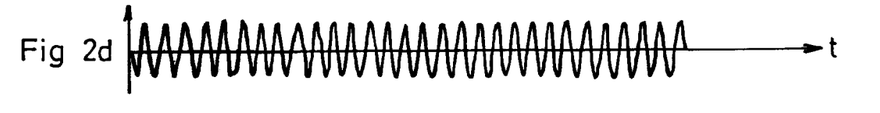
Figure 2E:
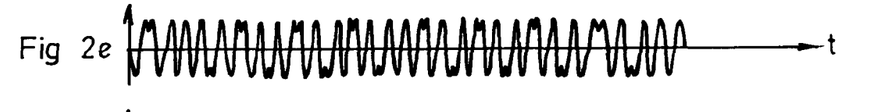
Figure 2F:
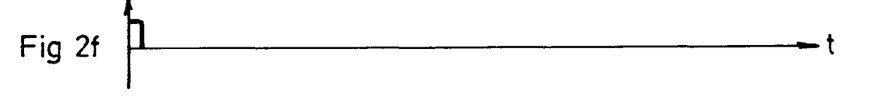
Figure 2G:
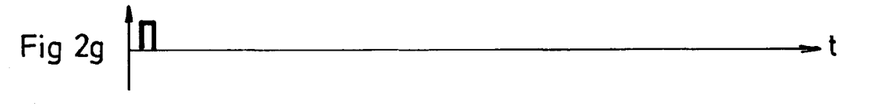
Figure 2H:
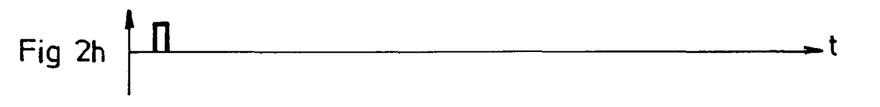
Figure 2I:
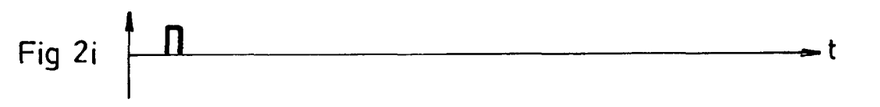

FIG. 2e exhibits a radio-navigation signal according to a BOC modulation. Such a signal is, for example, obtained by a pseudo-random code as represented in FIG. 2a, a subcarrier as represented in FIG. 2b and a carrier as represented in FIG. 2d.

FIG. 2c is a representation of the pseudo-random code with subcarrier. According to this embodiment, the ratio m/n amounts to 1 and the number of modified pseudo-random codes amounts to 4.

The reception of a signal modulated in accordance with such a BOC modulation comprises steps of digitisation of the received signal in order to give a digital signal, called the baseband signal, and steps of demodulation of the digitised signal.

The digitisation of the signal includes a step of sampling of the signal at a sampling frequency $f_e$. It is known that, in order to comply with the Shannon-Nyquist criterion which avoids the aliasing of the spectrum, the sampling frequency has to be greater than or equal to the bandwidth of the spectrum of the signal. Since the spectrum of a BOC signal has a wide frequency band, compliance with this criterion implies an elevated frequency $f_e$, implying a significant consumption of energy for the sampling of the signal. Consequently, according to an advantageous embodiment of the invention, the digitisation of the signal is followed of a step of translation of the lobes of the BOC signal towards one another in order to reduce the frequency band, making it possible to reduce the frequency of the processing operations for correlation, and therefore to reduce the consumption of energy.

Figure 3:
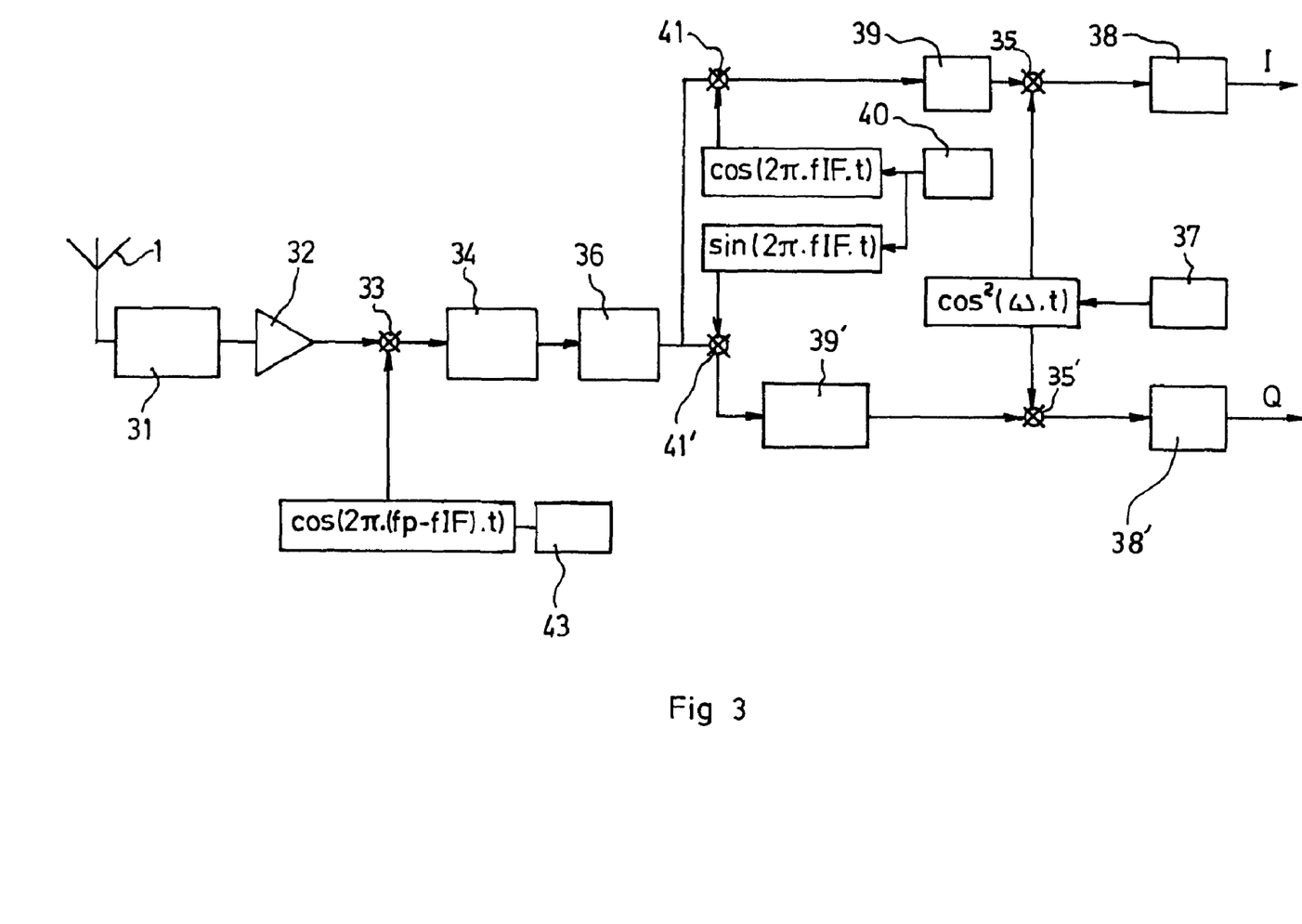
FIG. 3 is a schematic view of a radio-frequency module of a receiver according to an embodiment of the invention that is suitable to convert a received radioelectric signal into a digital baseband signal.

These steps of digitisation of the signal can be carried out by a radio-frequency module for digitisation of the signal, as represented in FIG. 3.

At the output of a receiving antenna 1 a band-pass filtering of the signal is preferably carried out by a band-pass filter 31, so as to eliminate the noise or the interferences outside the receiving frequency band. This band-pass filter 31 may be realised by any known means, for example by a ceramic filter. The resulting signal is preferably, as represented in FIG. 3, amplified by a low-noise amplifier 32.

According to an advantageous embodiment, the resulting signal is multiplied by a local oscillator, in order to go back down to an intermediate frequency $f_{IF}$ prior to digitisation. In order to do this, the signal at the output of the amplifier 32 is multiplied by a signal of the form $\cos(2\pi \cdot (f_p - f_{IF}) \cdot t)$ by a local oscillator 43 with the aid of a multiplier 33 which is suitable to carry out the multiplication of the amplified signal by this generated signal.

The resulting signal is preferably filtered by means of a band-pass filter 34 which may be of any type.

The resulting signal is then digitised by an analogue-to-digital converter 36.

The resulting signal is multiplied, on a first channel, called channel I, by a signal of the form $\cos(2\pi \cdot f_{IF} \cdot t)$ which is generated by a numerically controlled oscillator 40 with the aid of a multiplier 41 which is suitable to carry out the multiplication of the digitised signal by this generated signal. This same signal is also multiplied, on a second channel, called channel Q, by a signal of the form $\sin(2\pi \cdot f_{IF} \cdot t)$ which is generated by the numerically controlled oscillator 40 with the aid of a multiplier 41' which is suitable to carry out the multiplication of the digitised signal by this generated signal.

On each of the channels I and Q the resulting signal is filtered by means of a low-pass or band-pass filter 39, 39'. These filters 39, 39' may be of any type.

If the subcarrier is elevated, in optional manner a signal of the type $\cos^2(\pi \cdot \omega \cdot t)$ may be used in order to reduce the frequency of the processing operations.

Thus, according to this embodiment of the invention, on each channel the resulting signal is multiplied by a signal of the form $\cos^2(\pi \cdot \omega \cdot t)$, $\omega$ depending on the frequency of the subcarrier, on the clock pulse of the pseudo-random code, and on the sampling frequency. This signal is, for example, generated by a digital oscillator 37. The multiplications between the signals at the outputs of the filters 39, 39' and the signal generated by the digital oscillator 37 are carried out by two multipliers 35, 35' arranged respectively on each channel I and Q.

According to this embodiment of the invention, on each channel the signal is again filtered by a band-pass filter 38, 38' arranged respectively on each of the channels I and Q.

In this way the signal is ready to be demodulated.

In the case of the reception of a BOC signal for the purposes of positioning a receiver, the objective of the demodulation of the signal is to enable the measurement of the delay in propagation on the basis of the difference between the time of emission of the code by the satellite and the time of reception of the code by the receiver.

Moreover, a radioelectric signal emitted by a satellite in motion which is received by a receiver is subject to a Doppler effect, unknown to the receiver.

Consequently, the demodulation of the signal is effected by correlation of the received BOC signal with a carrier, a subcarrier and codes generated in the region of the receiver. This subcarrier and these codes generated in the region of the receiver are initialised, in order to exhibit a delay and a Doppler effect unknown a priori.

In a first phase, called the acquisition phase, the energy of an autocorrelation function between the signal received and the locally generated signal is evaluated with a view to searching for a maximum. This energy maximum is characteristic of a minimal phase offset between the received signal and the generated signal. This minimal phase offset indicates that the values of delay and of Doppler effect that are used for the evaluation of the energy are close to the actual values.

These values are then refined in a second phase, called the tracking phase.

Figure 4:
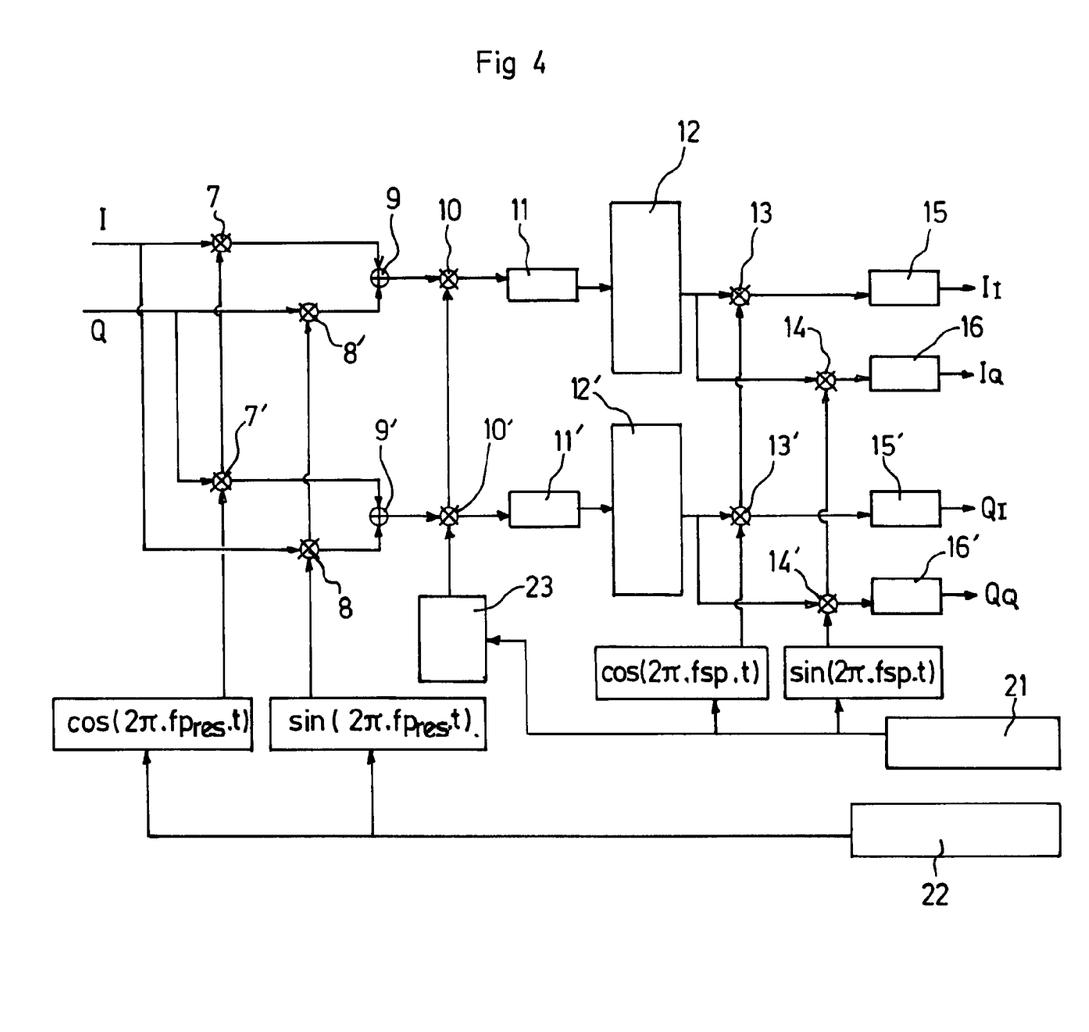
FIG. 4 is a schematic view of a digital module of a receiver according to an embodiment of the invention.

As represented in FIG. 4, the digitised signal is a complex signal including a channel I and a channel Q.

A process according to the invention which is implemented by and in a receiver according to the invention includes a first step of multiplication of the digitised signal on each of the channels I and Q by respective signals in phase and in quadrature which are generated at the frequency fires of the residual carrier by a carrier generator.

A receiver according to one embodiment of the invention for the implementation of this step may include, as represented in FIG. 4, a multiplier 7 which is suitable to carry out the multiplication of the baseband signal of channel I by a signal of the form $\cos(2\pi \cdot f_{Pres} \cdot t)$, a multiplier 7' which is suitable to carry out the multiplication of the baseband signal of channel Q by this same signal, a multiplier 8 which is suitable to carry out the multiplication of the baseband signal of channel I by a signal of the form $\sin(2\pi \cdot f_{Pres} \cdot t)$ and a multiplier 8' which is suitable to carry out the multiplication of the baseband signal of channel Q by this same signal.

The signals of the form $\cos(2\pi \cdot f_{Pres} \cdot t)$ and $\sin(2\pi \cdot f_{Pres} \cdot t)$ are generated in known manner by a numerically controlled oscillator.

On channel I, a receiver according to this embodiment includes a summing integrator 9 which is suitable to carry out the summation of the signals at the outputs of the multipliers 7 and 8'. On channel Q, a receiver according to this embodiment includes a summing integrator 9' in order to carry out the summation of the signals at the outputs of the multipliers 7' and 8.

A process according to the invention which is implemented by and in a receiver according to the invention then includes a step of generation of K modified codes, where $K=\alpha \cdot f_{sp}/f_c$, $\alpha$ being a predetermined integer. K expresses the partitioning carried out by the subcarrier of frequency $f_{sp}$ over a fragment of the pseudo-random code of frequency $f_c$.

According to one embodiment, as represented in FIGS. 2a to 2i, the frequency of the subcarrier is equal to the frequency of the pseudo-random code. Moreover, the subcarrier exhibits two levels. According to an advantageous embodiment, the integer α is fixed at 4, so that a generator of modified codes according to the invention enables the generation of 4 modified pseudo-random codes. Each code exhibits over a timespan $T_k$, where $T_k = \frac{1}{4} \cdot f_{sp}$, the sign of the pseudo-random code without subcarrier. In other words, each code has the form of a slot of duration $T_k$. The slots of the various modified pseudo-random codes are temporally offset, successively two by two, by a value $T_k$.

FIGS. 2f to 2i present the four modified pseudo-random codes generated in this way.

The generation of the K modified codes is carried out by a generator 23 of modified codes. This generator 23 is suitable to emit slots of duration $T_k$, separated successively, two by two, by a duration $T_k$.

On each of the channels I and Q the signals at the outputs of the summing integrators 9 and 9' are multiplied by these K modified pseudo-random codes by means of respective multipliers 10, 10'.

On each channel I and Q the results of these multiplications obtained at various instants are summed by means of summation elements 11, 11'.

On each channel I and Q the K results obtained at the outputs of the summation elements 11, 11' are temporally interlaced by interlacing devices 12, 12' so as to provide a single signal at the outputs of these interlacing devices.

In a following step, two operations are conducted in parallel on each channel, on the one hand the multiplication of the vector composed of the K elements by a signal of the type $\cos(2\pi \cdot f_{sp} \cdot t + \phi)$, synchronised on a leading edge of the pseudo-random code generated by the receiver, and on the other hand the multiplication of the vector composed of the K elements by a signal in quadrature of the type $\sin(2\pi \cdot f_{sp} \cdot t + \phi)$, synchronised on the leading edge of the pseudo-random code generated by the receiver. These multiplications are carried out on channel I by multipliers 13, 14, and on channel Q by multipliers 13', 14'.

The following step consists in summing, by means of summation elements 15, 16, 15', 16', the K elements on each channel.

This last step thus enables the generation of signals on four channels $I_I, I_Q, Q_I, Q_Q$. Throughout the following, the signals that are present on each of the channels $I_I, I_Q, Q_I, Q_Q$ will be written as $I_I, I_Q, Q_I, Q_Q$.

During the acquisition phase, a receiver according to the invention uses these four outputs in order to estimate the delay and the Doppler frequency and also in order to initialise the code loop and carrier loop.

A receiver according to the invention includes a module 18 for estimation of energy. This module 18 for estimation of energy is suitable to evaluate the energy E according to the relation $E = \Sigma(I_I^2 + I_Q^2 + Q_I^2 + Q_Q^2)$.

The estimation of energy by the estimation module 18 makes it possible to determine whether the tracking has been carried out on the principal peak of the autocorrelation function or on a secondary peak. In particular, a diminution of energy is representative of a tracking on a secondary peak. In such a case, a module 20 for correcting phase and delay is suitable to carry out a correction of the estimation of the delay of the code and a correction of the estimation of the phase of the carrier.

Figure 5:
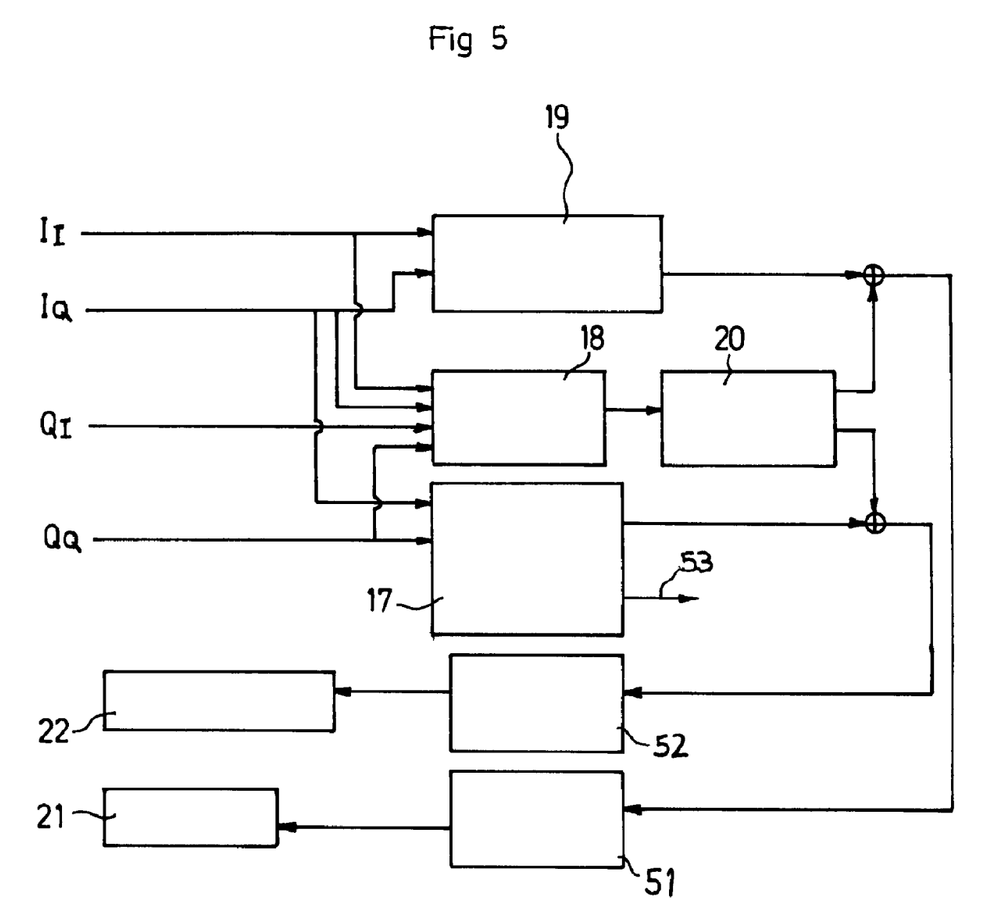
FIG. 5 is a schematic view of a digital module of a receiver according to an embodiment of the invention in tracking phase.

This corrective module 20 is suitable to provide a carrier phase and a code delay, represented schematically in FIGS. 4 and 5 respectively by a block module 22 and a block module 21. According to an advantageous embodiment, this carrier phase and this code delay may be respectively filtered in known manner by a loop filter 52 in respect of the carrier and a loop filter 51 in respect of the code.

The estimation of the phase of the carrier is carried out by using a function of the arctangent type. A receiver according to the invention includes a module 17 for estimating the phase of the carrier. This module 17 for estimating the phase of the carrier is suitable to estimate the phase in accordance with the relation $\delta\phi = \arctan(Q_Q/I_Q)$. According to another embodiment of the invention, the phase of the carrier can be estimated by other equivalent means.

In tracking phase, in addition to the module 17 for estimating the phase of the carrier and the module 18 for estimating the energy, a module 19 for estimating the phase of the subcarrier is used in order to enable the tracking of the code. According to the invention, the phase of the subcarrier is proportional to the delay of the code. The estimation of the subcarrier can be carried out on the basis of at least one of the pairs $(I_I, I_Q), (Q_I, Q_Q)$. In FIG. 5, the module 19 for estimating the phase of the subcarrier is realised solely on the basis of the pair $(I_I, I_Q)$.

This module 17 for estimating the phase of the carrier also makes it possible to ensure the demodulation of the navigation data transmitted by the BOC signal. These demodulated data are represented schematically by reference 53 in FIG. 5.

A receiver according to the invention may include, in known manner, electronic circuits that are suitable to implement the functions of the various modules previously described. In particular, the functions described may be realised by integrated circuits, by analogue circuits, by software means, or by a combination of software means and electronic circuits.

A process according to the invention and a receiver according to the invention enable the reception of a BOC signal comprising a weak subcarrier or an elevated subcarrier.

A process and a receiver according to the invention enable the reception of a composite radio-navigation signal comprising one or more BOC signals.

A process and a receiver according to the invention are particularly suitable and intended for the reception of signals transmitted by the GALILEO and GPS systems.

A process and a receiver according to the invention enable the reception of a radioelectric signal, in particular a radio-navigation signal, requiring fewer energy resources than the processes and receivers of the prior art.

The invention claimed is:

1. Process for receiving a composite radioelectric navigation signal comprising at least one signal, called the BOC signal, modulated by a carrier of frequency $f_p$, a square subcarrier of frequency $f_{sp}$ and a pseudo-random code of frequency $f_c$, lower than frequency $f_{sp}$, in which, the radioelectric navigation signal is transposed to an intermediate frequency and digitised, the digitised signal is correlated in phase and in quadrature by two local carriers in phase and in quadrature generated by a numerically controlled local carrier oscillator so as to provide a baseband signal comprising a channel, called channel I, and a channel, called channel Q, in quadrature in relation to said channel I, wherein:

successive pseudo-random codes, called modified codes, K in number, where $K = \alpha \cdot f_{sp}/f_c$, α being a predetermined integer, are generated locally by a digital generator of modified codes, each modified code exhibiting over a time-span $T_k$, where $T_k = 1/\alpha \cdot f_{sp}$, the form of the pseudo-random code without subcarrier, two successive modified codes being temporally offset by a duration $T_k$, on each channel the baseband signal is multiplied by the K modified pseudo-random codes, on each channel the K resulting signals are integrated over a predetermined period of time, on each channel the K results of integrations are temporally interlaced, on each channel the signal thus generated is correlated in phase and in quadrature by two locally generated subcarriers in phase and in quadrature, in order to provide signals, called channel-output signals, on each channel the channel-output signal is integrated over a predetermined period of time.

2. Process as claimed in claim 1, wherein, so as to enable an estimation of the delay of the pseudo-random code and a correction of the phase of the carrier:

an estimation of the delay based on a calculation of energy from channel-output signals ($I_I$, $I_Q$, $Q_I$, $Q_Q$) is carried out, an estimate of the phase of the carrier is calculated from said channel-output signals ($I_I$, $I_Q$, $Q_I$, $Q_Q$), integrated.

3. Process as claimed in claim 2, wherein, in tracking phase, an estimate of the phase of the carrier is calculated from the channel-output signals ($I_I$, $I_Q$, $Q_I$, $Q_Q$), an estimate of the phase of the subcarrier is calculated from the channel-output signals ($I_I$, $I_Q$, $Q_I$, $Q_Q$), a correction of the phase of the carrier and of the delay of the code is carried out if said estimated energy diminishes in the course of time, a demodulation of the navigation data transmitted by BOC signal is carried out.

4. Process as claimed in claim 3, wherein said estimation of energy consists in carrying out the quadratic sum of each of the channel-output signals ($I_I$, $I_Q$, $Q_I$, $Q_Q$).

5. Process as claimed in claim 3, wherein said estimation of the phase of the subcarrier is an estimation of the arctangent type.

6. Process as claimed in claim 3, wherein said integer α is fixed at 4.

7. Process as claimed in claim 2, wherein said estimation of energy consists in carrying out the quadratic sum of each of the channel-output signals ($I_I$, $I_Q$, $Q_I$, $Q_Q$).

8. Process as claimed in claim 7, wherein said estimation of the phase of the subcarrier is an estimation of the arctangent type.

9. Process as claimed in claim 7, wherein said integer α is fixed at 4.

10. Process as claimed in claim 2, wherein said estimation of the phase of the subcarrier is an estimation of the arctangent type.

11. Process as claimed in claim 10, wherein said integer α is fixed at 4.

12. Process as claimed in claim 2, wherein said integer α is fixed at 4.

13. Process as claimed in claim 1, wherein said integer α is fixed at 4.

14. Receiver for a radioelectric navigation signal comprising at least one signal, called the BOC signal, modulated by a carrier of frequency $f_p$, a subcarrier of frequency $f_{sp}$ and a pseudo-random code of frequency $f_c$, comprising:

a circuit for correlation of residual carrier in phase and in quadrature between said BOC signal and two local carriers in phase and in quadrature generated by a local carrier oscillator so as to provide a baseband signal comprising a channel, called channel I, and a channel, called channel Q, in quadrature in relation to said channel I, wherein it comprises:

a digital generator of K pseudo-random codes, called modified codes, where $K=\alpha \cdot f_{sp}/f_c$, α being a predetermined integer, each modified code exhibiting over a time-span $T_k$, where $T_k=1/\alpha \cdot f_{sp}$, the form of the pseudo-random code without subcarrier, and being temporally offset by a duration $T_k$ from the preceding modified pseudo-random code, a circuit for correlation in phase and in quadrature between the baseband signal and the K modified pseudo-random codes, a circuit for correlation in phase and in quadrature between the resulting signals and two locally generated subcarriers in phase and in quadrature.

15. Receiver as claimed in claim 14, including a carrier-phase estimator, a subcarrier-phase estimator and an energy estimator.

16. Receiver as claimed in claim 15, wherein the subcarrier-phase estimator is of the arctangent type.

17. Receiver as claimed in claim 16, wherein said energy estimator is suitable to carry out the quadratic sum of the channel-output signals ($I_I$, $I_Q$, $Q_I$, $Q_Q$).

18. Receiver as claimed in claim 15, wherein said energy estimator is suitable to carry out the quadratic sum of the channel-output signals ($I_I$, $I_Q$, $Q_I$, $Q_Q$).

19. Receiver as claimed in claim 15, wherein said integer α is fixed at 4.

20. Receiver as claimed in claim 14, wherein said integer α is fixed at 4.

* * * * *